Aug. 17, 1926.
R. A. STEPS
1,596,322
CENTRIFUGAL MOUNT
Filed April 24, 1923 2 Sheets-Sheet 1
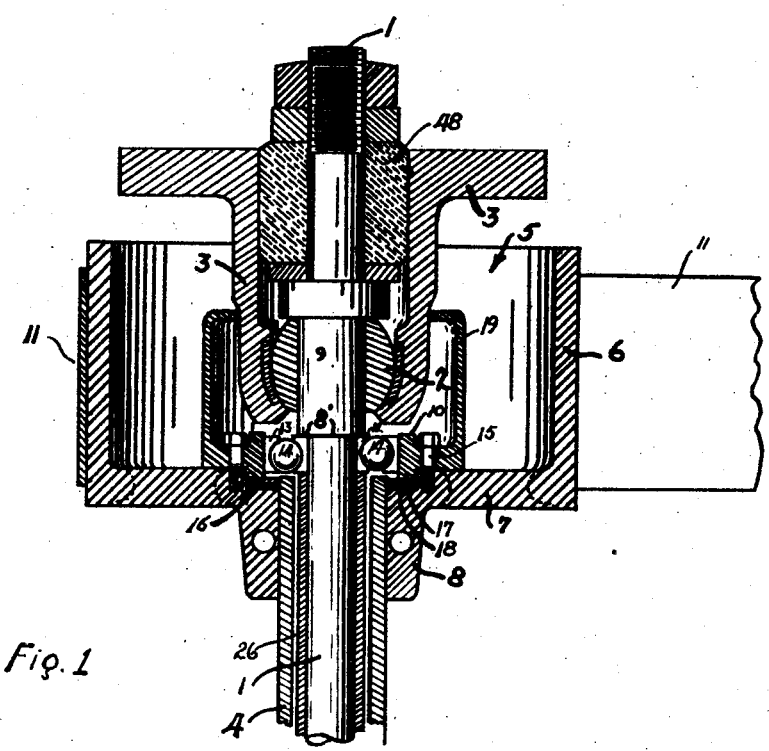
Fig. 1
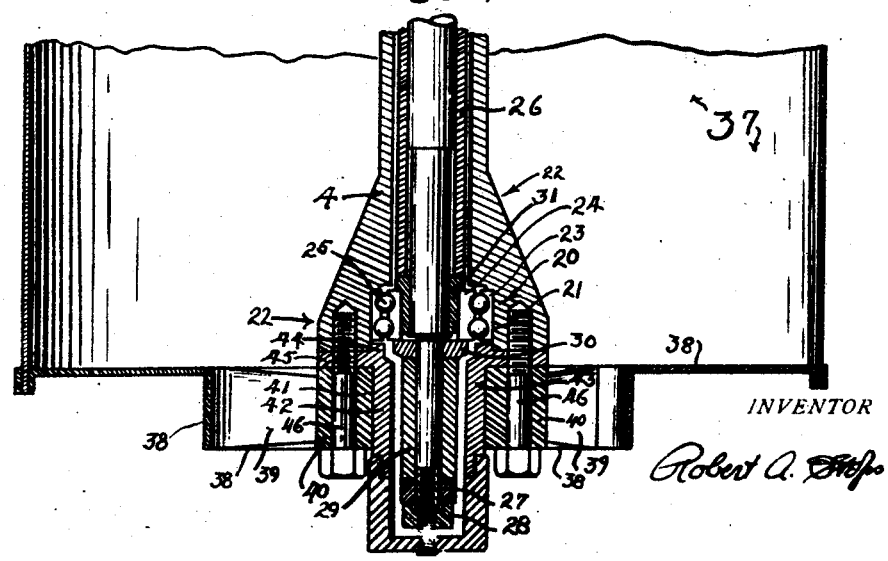
INVENTOR
Robert A. Steps Aug. 17, 1926.
R. A. STEPS
1,596,322
CENTRIFUGAL MOUNT
Filed April 24, 1923    2 Sheets-Sheet 2
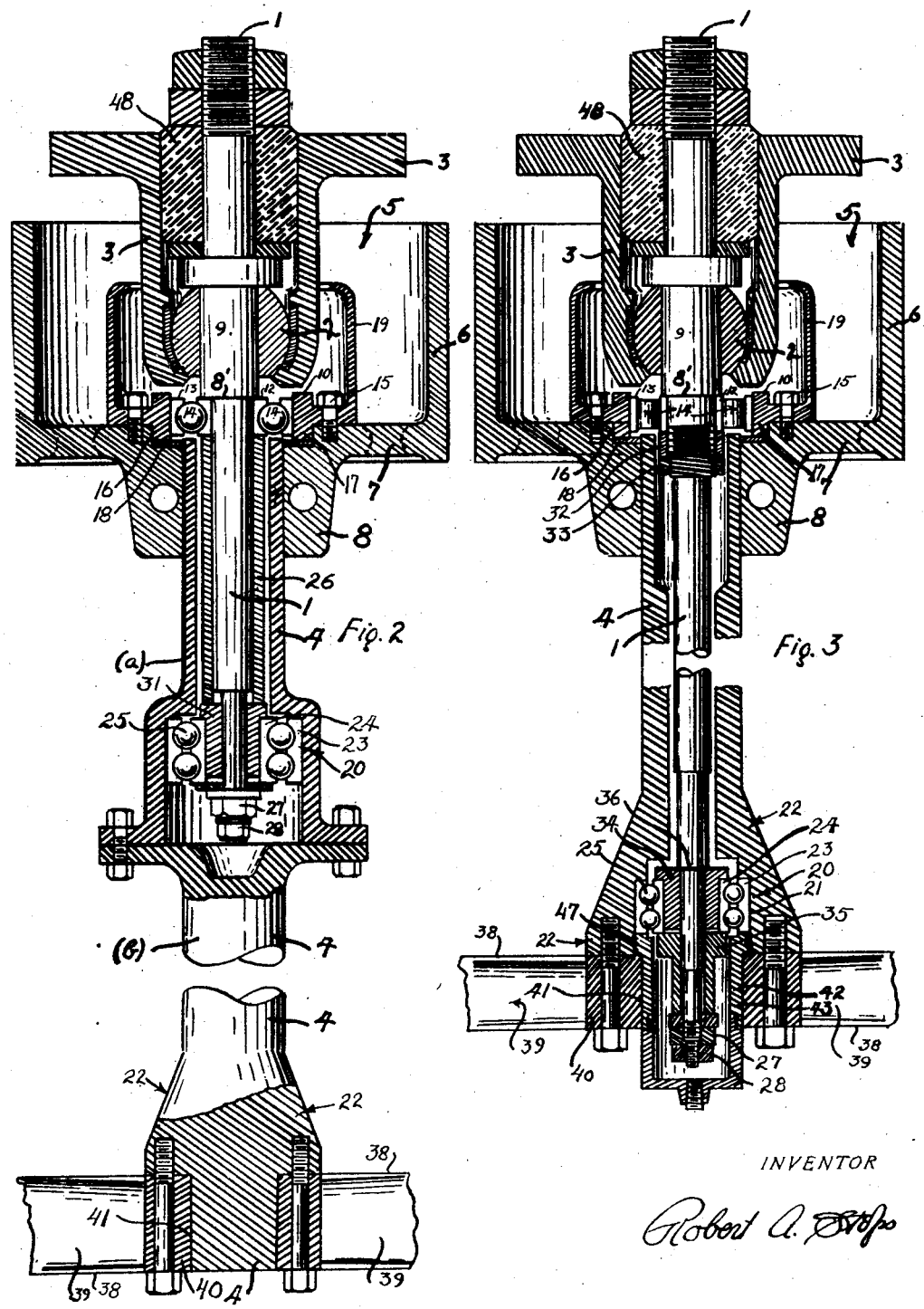
INVENTOR
Robert A. Steps Patented Aug. 17, 1926.

1,596,322

UNITED STATES PATENT OFFICE.

ROBERT ALEXANDER STEPS, OF LOS ANGELES, CALIFORNIA.

CENTRIFUGAL MOUNT.

Application filed April 24, 1923. Serial No. 634,325.

Of the centrifugal machines operating today in sugar factories, and other kinds of factories, by far the greater number are of one standard type.

These machines are characterized by having an inner non-rotating spindle oscillatively supported from above; and an outer rotating spindle having a driving pulley and a centrifugal basket connected with said rotatable spindle respectively near the upper and lower end of same.

The outer rotating spindle and connected parts are supported by the inner non-rotating oscillatory spindle by means of a long babbitt or bronze bearing sleeve adapted to carry the belt thrust and located near the upper end of the rotatable spindle, and also by means of a supplementary bearing and a series of friction discs adapted to carry the weight of the rotating spindle and located substantially below the first said bearing.

Owing to the continuous vibrations or gyrations of the rotating spindle during operation, which gyrations are permitted by the aforesaid oscillatory mounting of the inner supporting spindle, and which gyrations are continually and freely indulged in by the rotating spindle because of the ununiform loading of the basket, the service on the above bearings is very severe, and they are continuously breaking down requiring frequent annoying delays which constitute the principal difficulty which the users encounter during the operation of these machines.

Thousands of machines of the above type are in operation in the United States today, and for the purpose of eliminating or reducing these annoying shut downs required for frequent replacement of the relatively inferior bearings which they have, many attempts have been made to replace these bearings in the existing machines with ball or roller bearings, but all these attempts to thus eliminate the difficulty have been unsuccessful because no obvious means suggests itself for installing ball or roller bearings of sufficient size in the existing machines to carry the load imposed upon them. The largest ball or roller bearings that could be installed in the spaces obviously apparent to the mechanic have often been tried, but have always broken down much earlier than the old bearings because they were of too small load ratings, and on this account the effort to convert the existing machines to the ball or roller bearing type had been abandoned.

The frequency with which the old type bearings had to be replaced, however, is so annoying that many users have installed totally new centrifugals arranged originally to carry ball or roller bearings of the required size to carry the loads imposed, but the making of such completely new installation is obviously expensive and for that reason is progressing only slowly.

The invention set forth herein is characterized by the fact that by simple but ingenious rearrangement and modification of some of the parts in the existing Weston centrifugals of the above type, quantities of room are made available above what was previously possible, so that good serviceable ball or roller bearings of far greater load capacity than required, can be easily installed, and therefore by the application of this invention to the existing machines the annoying replacements of the old type bearings can be practically eliminated, as the effectiveness of the new ball or roller bearings is so much more superior as to many times outlast the old type bearings.

The accompanying drawings illustrate the invention.

Figure 1 is an elevation in section showing one form of the invention as applied to the so-called long spindle centrifugals.

Figure 2 is a similar view showing the same form of the invention applied to the so-called short spindle centrifugals.

Figure 3 is a similar view showing another form of the invention as applied in practice.

The inner non-rotating spindle 1 is oscillatively supported near its upper end by some suitable mounting which for purposes of illustration I have shown as comprising a ball and socket joint 2 carried in a heavy cast iron supporting bracket 3 which is firmly fastened to some other stationary supporting member above.

Of course, there are many other ways of oscillatively supporting the inner spindle but I have shown the ball and socket joint because it is well known in practice.

The outer rotating spindle 4 often consists of a unitary member as shown in the long spindle construction in Figure 1, but sometimes consists of more than one member as for instance the upper section (a) and the lower section (b) in the short spindle construction shown in Figure 2, these sections, however, being bolted together and rotating and operating as a unit together.

Near the upper end of the said rotating spindle the latter is connected with some suitable driving means, which in the figures I have illustrated as a belt pulley 5 having the usual rim portion 6, also a transverse driving portion comprising the web or spokes 7 and a depending hub portion 8 directly connected to the outer rotatable spindle 4.

In the cases where this invention is applied to the existing machines, the extreme upper end of the outer rotating spindle is cut short to about the amount shown in the figures, and at a point somewhat above this a downwardly facing shoulder 8' is formed on the inner spindle either by turning the latter to a smaller diameter below this shoulder, or by fastening a piece 9 onto the inner spindle, this piece being of larger diameter than the portion of the inner spindle below said downwardly facing shoulder for the purpose of giving the same shoulder effect as is shown at 8'.

At an elevation approximately between this shoulder and the upper extremity of the outer rotating spindle I have arranged an internally open cylindrical portion 10 projecting above the hub and transverse pulley portion 7.

It is within the open space formed by this internally open cylindrical portion 10 that I carry the bearing that supports the thrust of belt 11 which pulls the pulley sideways. This bearing consists of an inner race 12, an outer race 13, and a series of rolling members 14 between said races. As shown in Figure 1 these rolling members may be balls as in ball bearings, or they may be rollers as shown in the roller bearing in Figure 3.

For obvious reasons the said outer rotatable spindle 4, the pulley 5 and the internally open cylindrical portion 10 are fastened so as to rotate with each other, and though this fastening may be accomplished in several different ways I have shown it in the form of bolts 15 which happen to connect the member 10 directly with the transverse pulley portion 7.

For the purpose of making this connection more secure I have bored a recess 16 into the upper face of the hub and transverse pulley portion, and into this recess the depending neck 17, on the cylindrical member 10, fits accurately, the packing material 18 being securely held between the bottom of this neck and the bottom of the recess for the purpose of preventing the escape of lubricant in case the pulley hub is a split hub.

Of course, the general shape of the member on which the internally open cylindrical portion 10 is formed, may be variously fashioned, and may be fastened to rotate with the rest of the structure in various ways, as its only real function is to afford a thrust support for transmitting the belt pull to the bearing at a point between the downwardly facing shoulder 8' on the inner spindle and the upper extremity of the rotating spindle as shown. However, one convenient form of carrying this internally open cylindrical member 10 is to form it integrally with the lubricant reservoir 19 as shown in the figure. Any lubricant placed in this reservoir 19 will directly feed the upper bearing, and will freely pass through same down through the space between the outer and inner spindle to feed the bearing located below.

This last mentioned bearing 20 is located at a point substantially below the first said bearing, and the purpose of this bearing 20 is principally to carry the weight of the rotating spindle and its connected parts.

In the so-called long-spindle construction shown in Figure 1 I have found or created sufficient room for a bearing of proper size by boring the central cylindrical recess 21 upward from the bottom of the rotatable spindle 4 into the substantially conical portion 22 of the spindle located at this point. In the form of the invention which I prefer this lower bearing 20 consists of a race 23 adapted to rotate with the rotatable spindle parts and a race 24 adapted to be supported by the inner non-rotating spindle, and a series of rolling members 25, which may consist either of balls or rollers between said races.

The particular form in which I have shown the lower bearing 20 is known as a combination thrust and radial bearing, but any other suitable form of ball or roller bearings adapted to perform the required service may of course be substituted in the space which this invention produces for this purpose.

Though it is not always necessary to fasten or lock the respective races to the parts with which they fit, yet it is advisable to do so, and the arrangement which I have achieved lends itself nicely to such locking or fastening of the races.

In Figure 1 the inner race 12 of the upper bearing is forced and locked against the downwardly facing shoulder 8' on the inner spindle by means of the spacing member 26 which receives its locking thrust from the nut and lock nut 27 and 28 respectively, located at the lower end of the inner spindle and forcing upward through members 29, 30, 24 and 31 onto the spacing member 26, in an obvious manner.

Figure 2 shows substantially the same structure for forcing and locking the inner race 12 of the upper bearings, up against the downwardly facing shoulder 8' on the inner non-rotating spindle.

In Figure 3, however, a modified form is shown consisting of nut 32 and lock nut 33 running on screw threads formed on the inner spindle adjacent to these nuts.

In this form I prefer to fasten the race 24 of the lower bearing between the spacing members 34 and 35 which are clamped together by the combined action between nuts 27 and 28 at the lower end of the spindle and the downwardly facing shoulder 36 formed on this spindle immediately above the spacing member 34.

This form has the advantage of leaving the outer rotating spindle stronger than the form shown in Figure 1, as the spindle need not then be bored out for allowing room and clearance for inserting the spacing member 26 shown in Figure 1.

The arrangement shown in Figure 1 has the advantage however that the upper race can be locked in place at the same time that the race 24 is locked, so that by firmly fastening the nuts 27 and 28 the operator may be certain that the entire system including the upper and lower bearings are tight in place.

A further feature which will be observed is the fact that both the upper and lower bearings are installed on the inner spindle by slipping them upward over the lower end of the inner spindle to their respective operating positions on the spindle. The upper bearing is of course so installed at a time when the inner spindle is removed from the outer spindle.

Though the tastes of various builders and users vary, I consider it advisable to give a good hand press fit between the outer race 13 of the upper bearing and the cylindrical portion 10 that receives it, so that this race will be more or less free to slip up or down in this cylindrical portion 10 and thus avoid carrying any substantial portion of the weight or thrust load of the rotating spindle, and yet this fit should not be so loose as to permit the race 13 and the portion 10 to rotate with reference to each other, and for this purpose a pin may be arranged to prevent this relative rotation of the race without preventing the slippage of same either upward or downward. The same kind of a fit is desirable for race 23 in recess 21. With attention to this question, and also attention to accurately forming and facing the various shoulders and spacing members that combine to hold the races, an extremely good and serviceable arrangement results, and since the bearings themselves are ground accurately to a few ten-thousands of an inch, and then hardened, the entire arrangement is found to be so serviceable that the troublesome and frequent annoyances of having to replace the old type bearings now operating in the existing machines, is reduced so much as to be eliminated for all practical intents and purposes.

In a manner that is well understood the usual centrifugal basket 37 is connected with the lower end of the rotating spindle by means of a bottom basket spider 38 having the spider arms 39 and spider hub 40. This spider hub has a central centering aperture 41 bored therein, the purpose of which is to give the spider and basket a centralizing alignment with reference to the axis of the rotating spindle, as this is important for purposes of balance.

In the long-spindle construction shown in Figures 1 and 3, I insert a separate centralizing member 42 between the bearing 20 and the recess in which it is carried, and the spider hub 40, this separate member having a centering post 43 fitting nicely in the centering aperture 41 of the spider hub to give it alignment, and this member also having a centralizing engagement of its own with the bottom substantially conically shaped portion of the rotating spindle 4.

In Figure 1 this centralizing member 42 receives its centering engagement with the rotating spindle by means of the neck or shoulder 44 projecting upward from flange 45 and fitting accurately into the recess 21, the said member being fastened to the lower external conically shaped portion of the rotating spindle by the same bolts 46 that fasten the spider to the spindle, a thin gasket being inserted between the flange 45 and the bottom of the spindle for the purpose of preventing leakage of the lubricant.

In Figure 3, however, the form of this centering member is slightly varied, and shows same as screwed into the recess 21 by means of the screw threads 47. In this structure the member may be screwed tight against the bottom of race 23 for the purpose of fastening it in place, and a gasket between this race and the top of member 42 may be inserted or not as suits the taste of the builder. Of course, additional modifications in the shape of this centering member can be arranged, but the two forms shown are deemed sufficient to illustrate its application.

It will also be understood by those familiar with the art that the oscillations of the mechanism about the oscillatory support 2 are dampened by means of a rubber bumper 48, but notwithstanding the gyrations are still considerable and continually present during operation of the centrifugal. On this account I like to arrange the lower bearing for carrying the weight or thrust of the rotating spindle, as far below the oscillatory support as the structure will permit, because in this location the load remains more evenly distributed over the balls or rollers and the slapping or hammering action which the gyrating motion creates is reduced to a minimum. This results in somewhat longer life for the rolling members, than if same were located near the oscillatory mounting.

In speaking of the inner spindle as being non-rotatable, it will be understood that this term is relative only with reference to the outer rotatable spindle, the weight of the inner spindle, together with the weight of the parts which it carries, and the compressive action of the bumper 48 being usually sufficient to hold the inner spindle against rotation, but if same should creep or rotate around slowly, this is so slight as to be negligible, and for all practical purposes the inner spindle may be regarded as non-rotatable, this slight creepage notwithstanding.

Also in describing and claiming this invention the word balls or the word rollers, or rolling members, are used interchangeably and each is hereby made to specifically include the other, as the question of whether balls or rollers are to be used is a mere question of taste to be decided by the builder.

Also, though this invention is particularly useful and unique in that it affords a good serviceable mode of converting the innumerable existing machines from their crude type bearings to this improved type of bearing system, without requiring the abandonment of the old spindle parts and the substitution of new ones, yet this construction is additionally very serviceable and practicable in connection with the building of new centrifugals, and I also recommend it for that purpose, as many of its features give benefits and advantages which are not found even in new ball or roller bearing centrifugals as turned out today.

Of course, the precise parts and arrangements which I have shown are subject to modification in various particulars without departing from the invention as claimed herein.

Claims:

1. In a centrifugal mount the combination of an inner non-rotatable spindle, ball and socket supporting means for oscillatively suspending said non-rotatable spindle vertically, an outer rotatable spindle hollow at its upper end and concentrically surrounding the lower part of said non-rotatable spindle, a driving pulley having a transverse driving portion and carrying a bearing receiving portion and a lubricant reservoir concentric therewith and rising from the upper face of said transverse pulley portion to a place above the bottom of the socket portion of said ball and socket supporting means, a bearing comprising inner and outer races and rolling members between said races, said bearing being located between said bearing receiving portion and said inner non-rotatable spindle at a place above the hollow upper end of said rotatable spindle and immediately below the socket portion of said ball and socket supporting means, the outside diameter of the outer race of said bearing being larger than the outside diameter of the upper hollow end of said outer rotatable spindle, the diameter of said inner non-rotatable spindle at all places below said bearing being such that the inner race of said bearing can be drawn off over the lower end of said inner spindle during dismantling of the structure, and a thrust bearing carried by said inner spindle below the first said bearing, said thrust bearing being adapted to carry revolving weight imposed by said rotatable spindle.

2. In a centrifugal mount the combination of an inner non-rotatable spindle, ball and socket supporting means for oscillatively suspending said non-rotatable spindle vertically, an outer rotatable spindle hollow at its upper end and concentrically surrounding the lower part of said non-rotatable spindle, a driving pulley having a transverse driving portion directly connected to said rotatable spindle near its upper end, a separate bearing receiving member having a lubricant reservoir concentric therewith said reservoir rising from the upper face of said transverse pulley portion to a place above the bottom of the socket portion of said ball and socket supporting means, packing means between said bearing receiving member and said transverse pulley portion for preventing the escape of lubricant from said lubricant reservoir, a bearing comprising inner and outer races and rolling members between said races, said bearing being carried between said bearing receiving portion and said inner non-rotatable spindle at a place above the hollow upper end of said rotatable spindle and immediately below the socket portion of said ball and socket supporting means, the outside diameter of the outer race of said bearing being larger than the outside diameter of the upper hollow end of said outer rotatable spindle, the diameter of said inner non-rotatable spindle at all places below said bearing being such that the inner race of said bearing can be drawn off over the lower end of said inner spindle during dismantling of the structure, and a thrust bearing carried by said inner spindle below the first said bearing, said thrust bearing being adapted to carry revolving weight imposed by said rotatable spindle.

3. In a centrifugal mount the combination of an inner non-rotatable spindle, ball and socket supporting means for oscillatively suspending said non-rotatable spindle vertically, an outer rotatable spindle hollow at its upper end and concentrically surrounding the lower part of said non-rotatable spindle, a driving pulley having a transverse driving portion, a separate lubricant reservoir member concentric with both said spindles and extending upward to a place above said transverse pulley portion and above the bottom of the socket portion of said ball and socket supporting means, said lubricant reservoir having an internally open cylindrical bearing receiving portion immediately below said socket portion of said ball and socket supporting means and above the top hollow end of said outer revolving spindle, the inside diameter of said bearing receiving portion being larger than the outside diameter of the top hollow end of said outer rotatable spindle, a bearing comprising inner and outer races and rolling members between said races, said bearing being carried in said bearing receiving portion of said lubricant reservoir immediately below the socket portion of said ball and socket supporting means, the diameter of said inner spindle at all places below said bearing being such that the inner race of said bearing can be drawn off over the lower end of said spindle during dismantling of the structure, and a thrust bearing carried by said inner spindle below the first said bearing, said thrust bearing being adapted to carry revolving weight imposed by said rotatable spindle.

4. In a centrifugal mount the combination of an inner non-rotatable spindle having a downwardly facing shoulder, ball and socket supporting means for oscillatively suspending said non-rotatable spindle at a place immediately above said shoulder, an outer rotatable spindle hollow at its upper end and concentrically surrounding the lower part of said non-rotatable spindle, driving means having a transverse driving portion directly connected with said outer rotatable spindle, a bearing receiving portion extending above said transverse pulley portion and located immediately below the socket portion of said ball and socket supporting means, a lubricant reservoir concentric with said bearing receiving portion and extending upward above same to a place above the bottom of the socket portion of said ball and socket supporting means, a bearing in said bearing receiving portion, said bearing being carried by said inner non-rotatable spindle at a place immediately below said downwardly facing shoulder and above the top hollow end of said revolving spindle, a thrust bearing also carried by said inner non-rotatable spindle but at a place below the first said bearing, both said bearings comprising inner races and outer races, and rolling members between said races, and means for simultaneously locking the inner races of both said bearings against rotation, said means comprising a nut threaded onto the lower end of said inner non-rotatable spindle, and a spacing tube embracing said non-rotatable spindle in the space between said bearings.

Signed at Denver, in the county of Denver, and State of Colorado, this 20th day of April, 1923.

ROBERT ALEXANDER STEPS.